# United States Patent Office 3,210,329
Patented Oct. 5, 1965

3,210,329
COMPLEX CATALYSTS COMPRISING ORGANO-METALLIC COMPOUND, METALLIC HALIDES AND DIOXANE FOR THE POLYMERIZATION OF POLAR MONOMERS
Lloyd T. Jenkins, Cary, N.C., assignor, by mesne assignments, to Monsanto Company, a corporation of Delaware
No Drawing. Filed Oct. 24, 1960, Ser. No. 64,313
9 Claims. (Cl. 260—88.7)

This invention relates generally to heterogeneous catalyst systems, and more particularly to novel catalysts of this type which are capable of initiating the polymerization of polar monomers, such as acrylonitrile.

In recent years the most significant development in the field of polymerization catalysis has been the utilization of complex compounds in heterogeneous polymerization systems. Thus, for example, in the Reid patent, U.S. 2,355,925, a polymerization process was disclosed wherein liquid polymers were produced from olefins using a catalyst consisting of aluminum chloride, zirconium chloride or titanium chloride in the presence of alkaline earth metals, alkali metals, oxides of alkali or alkaline earth metals, alkali metal alloys, or other such agents which react with hydrogen choride. Ethylenically unsaturated compounds have also been polymerized in the presence of TiCl₄ and oximes (Howard, U.S. Patent 2,567,109). Many other examples could be given but perhaps the best known among the catalyst systems which embody the principle of surface active initiators to synthesize polymer structures are those disclosed by Ziegler in German Patents 878,560 and 917,006 and U.S. Patent 2,781,410 wherein aluminium trialkyls complexed with metal halides are employed.

Perhaps, the outstanding advantage of the newer interfacial or heterogeneous catalyst systems over the older redox or free radical type initiators is their capability for directing successive monomer additions to the polymer chain in an ordered fashion, thus making it possible to increase such important polymer properties as density, crystallinity and melting point.

Because of the great advantages which are realized in the use of these new catalyst systems, it is, of course, desirable that their applicability be as extensive as possible. However, inasmuch as is known, it has not been possible heretofore to prepare any non-hydrocarbon polymer with these interfacial type polymerization initiators.

Accordingly, it is a principal object of this invention to provide new complex catalyst systems which are capable of initiating the polymerization of polar monomers, such as acrylonitrile.

It is another object of this invention to provide a method for preparing the novel catalysts of this invention.

It is a further object of this invention to provide methods of polymerizing ethylenically unsaturated, polar monomers in the presence of the novel catalysts of the present invention.

Other objects of the invention will become apparent in the following description.

It has now been discovered that the above objects can be attained by conducting the polymerization of polar monomers in the presence of a catalyst system formed from components which comprise an organometal compound, a co-complexing agent, e.g., dioxane and a metal halide. In addition to the primary catalyst components, a minor amount of lithium chloride may be employed as a catalyst adjuvant or promoter.

The organometal compounds referred to include without limitation, alkyl, cycloalkyl or aryl compounds of metals of Groups IV–A and V–A of the Mendeleev Periodic Table, such metals including germanium, tin, lead, bismuth, and antimony. Among the applicable metals, tin, lead and bismuth are especially preferred. The organo radical can be quite large, compounds being applicable with fifteen or more carbon atoms in each alkyl, cycloalkyl or aryl group. Illustrative examples of suitable compounds of this type are tetraethyl lead, tetrabutyl tin, bismuth triphenyl, tetraisobutyl lead, tetraethyl tin, tetraoctyl lead and tetraethyl tin. Tetraethyl lead is especially preferred, partly as a matter of convenience since it is readily available in commerce.

The metal halide component of the catalyst systems of this invention comprise the halides of the metals found in Groups IV–A, IV–B, V–A and V–B of the Mendeleev Periodic Table, and include metals such as titanium, zirconium, hafnium, vanadium, niobium, tantalum, molybdenum, tin, lead and bismuth. Examples of metal halides which can be used include titanium tetrachloride, zirconium tetrabromide, vanadium tetrachloride, stannic chloride, bismuth trichloride, hafnium tetraiodide, niobium difluoride, tantalum diiodide and the like. Among the suitable metal halides stannic chloride, titanium tetrachloride and bismuth trichloride are particularly outstanding. Mixtures of two or more of the metal halides can be employed if desired. It is especially desirable that the metal halide employed be in an anhydrous condition.

Briefly, the catalysts of this invention are prepared by first introducing the organo-metallic compound of choice into a reaction medium of dioxane. This is followed by adding the metal halide component to the mixture. A precipitate of metallic halide dioxanate forms immediately and is permitted to dissolve back into the reaction vehicle, i.e., the dioxane, which is employed in excess of that which will enter into reaction. The resulting solution is allowed to stand for a period of time until a crystalline substance forms constituting the active catalyst complex. This product may be isolated from the reaction mass by filtration.

In preparing catalysts for use in this invention, all steps should be carried out in the absence of moisture, and preferably also in the absence of oxygen or other harmful impurities. This may be done conveniently by blanketing the materials with an inert gas, such as nitrogen. The raw materials should be purified to remove traces of moisture, oxygen and other impurities prior to use.

The proportions of the components used to prepare the catalyst may vary over a wide range of concentrations. In fact, insofar as we have been able to determine, the proportions of the catalyst components are not believed to be critical. Typically, the organo-metal and the metal halide components may be used in respective molar proportions of from 10:1 to 1:10. Ordinarily, the preferred ratios range from about 5:1 to 1:5, and it has been found particularly advantageous to use molar ratios of about 1:1.

The order in which the organo-metal and the metal halide are added to the dioxane is considered critical, i.e., the organo-metal component is introduced first followed by the metal halide. It is usually necessary to add the metal halide ingredient slowly and with caution since there is a rapid, exothermic reaction with the dioxane forming a metallic-halide dioxanate.

When lithium chloride is employed as an optional catalyst adjuvant or promoter, it may be added to the catalyst forming reaction mixture following the addition of the primary components used in forming the complex catalyst. Best results are achieved when an amount is used in the range about 0.5 to 5 percent by weight based on the total weight of the catalyst forming ingredients employed, with from about 0.5 to 1 percent being preferred.

It is not possible to state the exact composition of the complex catalysts which are prepared in the manner as just described. It is significant, however, that the resulting composition is catalytically different from any of the catalyst-forming starting ingredients alone. It is also highly significant that the complex formed in the manner just outlined is distinctly different in catalytic activity from that formed by the well known Ziegler-type synthesis when employing the same organo-metal and metal halide compounds as starting ingredients. That is, catalysts produced in the latter type synthesis are generally not capable of initiating the polymerization of polar monomers.

The present invention is based at least in part on the surprising discovery that a water insoluble organo-metallic compound, such as tetraethyl lead, can be complexed with an anhydrous metal halide, e.g., stannic chloride, in a water soluable ether, i.e., dioxane, and have the complex thus formed, not only become water soluble, but be completely stable in water or other solvents of high dielectric properties, such as are commonly employed as reaction media in liquid polymerization reactions.

It appears that the employment of dioxane in the preparation of these complex catalysts is an important key to the results attainable in the practice of this invention. Thus, when such closely related compounds as n-butyl ether, diphenyl ether and tetrahydrofuran were substituted for dioxane, either no complex formed or when one did, it was found to be catalytically inactive. As mentioned previously, the dioxane ingredient functions not only as a reaction medium for forming the catalyst complex, but also reacts with other components in forming the active catalyst.

As has been noted, the catalysts provided by this invention are useful in initiating the polymerization of non-hydrocarbon or polar type monomers. Heretofore, such polymerizations were not amenable to initiation by interfacial type catalysis, and free-radical catalysis has been almost exclusively used. Among the polar monomers which can be catalyzed in polymerization reactions by the complex catalysts of this invention are methyl methacrylate, vinylidene chloride, vinyl acetate, N-vinylphthalimide, vinyl pyridine, acrylonitrile and other olefin containing polar monomers.

The initiators of this invention are especially useful when employed for inducing the polymerization of acrylonitrile. They are useful not only in producing the homopolymer but also a wide variety of copolymers. Among the olefinic monomers which may be polymerized with acrylonitrile while using the polymerization initiators of this invention are acrylic, alpha-chloracrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-cloro-1-bromoethylene; methacrylonitrile; acryamide and methacrylamide; alpha-chloracrylamide, or monoalkyl substitution products thereof; methyl vinyl ketone, vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha,beta dicarboxylic acids or their anhydrides or derivatives, such as diethylcitraconate; diethylmesaconate, styrene, vinyl naphthalene, vinyl-substituted tertiary heterocyclic amines; such as vinyl pyridines, for example, 2-vinylpyridine, 4-vinylpyridine, 2-methyl-5-vinylpyridine, etc.; 1-vinylimidazole and alkyl-substituted 1-vinylimidazoles such as 2-, 4-, or 5-methyl-1-vinylimidazole and other olefin containing polymerizable material.

In effecting polymerization the initiators are contacted with the monomer or monomers in the liquid phase, and preferably in a solvent or reaction vehicle having a fairly high dielectric constant, i.e., inexcess of 2.0 at 25° C. Suitable reaction vehicles that may be mentioned are water, chlorobenzene, methyl alcohol, dimethyl formamide, n-buyl alcohol, dioxane, ethylene glycol, monomethyl ether, diphenyl ether, tetrahydrofuran, acetone, benzene and ispropyl benzene among others. Water is particularly preferred because of its ready access and obvious economy. It has been found that the choice of solvent has an influence on the molecular weight of the ultimate polymer produced. Thus, for example, the highest molecular weight polymers were obtained when water was used as the reaction vehicle.

The polymerization process proceeds over a relatively wide temperature range with temperatures ranging from 0° C. to 250° C. being applicable, and particularly good results being obtained in the range of from about 40° C. to about 80° C. The pressure can be varied as desired with atmospheric pressures or even lower being applicable. In some instances it may be desirable to use superatmospheric pressures in order to increase the monomer concentration in contact with the catalyst. Although the polymerization pressure may be widely varied, pressures in the range of from atmospheric to 150 atmospheres absolute are generally used. The reaction time can be varied as desired from a period of a few minutes to a number of hours. When a batch process is employed, the reaction time normally used is from about 5 to 8 hours.

The quantity of catalyst employed can be varied over a wide range, and the amount needed to induce polymerization is not critical. However, it is generally advisable to employ more than trace amounts since there should at least be enough catalyst present to produce a reasonable rate of reaction.

The amount of vehicle or solvent employed can vary over wide limits in relation to the monomer-catalyst mixture, it being only necessary that sufficient monomer be in solution at any given time to effect reaction thereof. Generally speaking, when the monomer is in higher concentration, the rate of polymerziation is increased. Following the polymerization reaction, the polymer can be separated from the catalyst solvent by any of several well known methods. One convenient method is to treat the reaction mixture with methanol or methanol-acetone mixture followed by filtering and thereafter a drying operation.

To illustrate the manner in which the invention may be carried out in greater particularity, the following examples are given. It is to be understood, however, that the examples are for the purpose of illustration only, and the invention is not to be regarded as limited to any of the specific materials or conditions recited therein. Unless otherwise specified, parts disclosed in the examples are by weight.

*Example I*

A catalyst complex was prepared by adding 25 parts of dry, peroxide free dioxane 1.7 parts of tetraethyl lead. To this solution there was cautiously added 2.2 parts of anhydrous stannic chloride. A precipitate formed immediately and was permitted to redissolve upon standing. The resulting solution was permitted to stand over night and a crystalline complex formed. These crystals, constituting the active catalyst, were then isolated by filtration. The catalyst complex obtained was then added to a 500 ml. round bottom flask containing 100 parts of water and 20 parts of redistilled acrylonitrile. Heat was applied to the reaction flask which had been previously purged with nitrogen gas. The resulting reaction was allowed to run for 6 hours with the temperature varying between 64° to 71° C. The polymer formed was isolated with methanol and recovered by filtration. There was 8.7 grams of polyacrylonitrile recovered.

*Example II*

To 25 parts of dioxane there was added 1.7 parts of tetraethyl lead. To this solution there was slowly added one part bismuth trichloride. A precipitate formed with the evolution of heat and dissolved upon standing. The resulting solution was allowed to stand over night and a crystalline complex formed. These crystals which formed the active catalyst were isolated by filtration. The resulting active catalyst was added to a reaction flask containing 100 parts of water and 20 parts of acrylonitrile. The polymerization reaction which followed was run for 6 hours at an average temperature of 70° C. There was recovered 2.3 grams of polyacrylonitrile.

*Example III*

A catalyst complex was prepared by adding 1.7 parts of tetraethyl lead to 25 parts of dioxane. To this solution there was slowly added 2.2 parts of anhydrous stannic chloride and one part of lithium chloride. A precipitate formed which dissolved upon standing. This solution was then permitted to stand for 12 hours whereupon a crystalline complex formed. The crystals which constituted the active catalyst were isolated by filtration. The catalyst obtained was added to a reaction vessel containing 100 parts of water and 20 parts of acrylonitrile. The resulting polymerization raction was permitted to run for 6 hours at a temperature varying from 65 to 70° C. Following treatment with a methanol-acetone solution and a filtration step there was recovered 14.1 grams of polyacrylonitrile.

*Example IV*

To 25 parts of dioxane there was added 2 parts of tetrabutyl tin. To this solution there was cautiously added 2.2 parts of anhydrous stannic chloride. An exothermic reaction occurred with the formation of a precipitate. The precipitate was permitted to dissolve in the solution from which it was formed. The resulting solution was allowed to stand for approximately 12 hours during which a crystalline complex formed. These crystals which constituted the active catalyst were isolated by filtration. The resulting catalyst was added to a reaction vessel containing 100 parts of water and 20 parts of acrylonitrile. A polymerization reaction was initiated and allowed to run for about 7 hours at an average temperature of 68° C. The reaction yielded 3.8 grams of polyacrylonitrile.

*Example V*

A catalyst complex was prepared by first adding 0.5 part of bismuth triphenyl to 25 parts of dioxane. There was then slowly added to this mixture 2.2 parts of anhydrous stannic chloride. Following the addition of these ingredients a precipitate formed which upon standing dissolved in the solution from which it formed. After the solution was permitted to stand for approximately 12 hours a crystalline complex formed which was the active catalyst. The catalyst complex was then added to a 500 ml. round bottom flask which contained 100 parts of water and 20 parts of acrylonitrile. This mixture was heated at an average temperature of 66° C. for about 6 hours after which 4.8 grams of polyacrylonitrile was recovered.

The process of this invention may incorporate the use of antioxidants, dispersants and other modifying agents commonly used with polymer products.

The polymers produced in accordance with this invention have utility in all of the applications found for the corresponding polymers which are presently being manufactured, e.g., as fibers, films, sheets, coatings and molded articles.

It is not intended that the invention be limited to the above specific examples of materials and reaction conditions, but only by the appended claims in which it is intended to claim all novelty inherent in the invention as well as all modifications coming within the spirit and scope thereof.

What is claimed is:

1. A composition of matter suitable for use in initiating the polymerization of ethylenically unsaturated polar monomers which comprises the product obtained by first introducing an organo-metallic compound into a solution of dioxane followed by the addition thereto of a metal halide, said organo-metallic compound consisting of a metal selected from Groups IV–A and V–A of the Mendeleev Periodic Table of the Elements and hydrocarbon radicals selected from the group consisting of alkyl, and aryl radicals, and said metal halide consisting of a halide and a metal selected from Groups IV–A, IV–B and V–B of the Mendeleev Periodic Table, and wherein said organo-metallic compound and said metallic halide are present in a molar ratio of from 1:10 to 10:1, permitting reaction to take place in an anhydrous and inert atmosphere, allowing crystals to form and settle out from the resulting reaction mixture and thereafter recovering the crystals from said reaction mixture.

2. The composition of claim 1, wherein said organo-metallic compound is tetrabutyl tin.

3. The composition of claim 1, wherein said organo-metallic compound is bismuth triphenyl.

4. The composition of claim 1, wherein said metal halide is bismuth trichloride.

5. The composition of claim 1, wherein said organo-metallic compound and the said metal halide are present in a molar ratio of 1:1.

6. A process for the polymerization of ethylenically unsaturated polar monomers which comprises reacting the same in a solvent having a dielectric constant in excess of 2.0 at 25° C., under inert conditions, at a temperature in the range of from 40° C. to about 80° C., at a pressure in the range of from 1 to 150 atmospheres absolute and in the presence of a catalytic amount of a catalyst obtained by first introducing an organo-metallic compound into a solution of dioxane followed by the addition thereto of a metal halide, said organo-metallic compound consisting of a metal selected from Groups IV–A and V–A of the Mendeleev Periodic Table of the Elements and hydrocarbon radicals selected from the group consisting of alkyl, and aryl radicals, and said metal halide consisting of a halide and a metal selected from Groups IV–A, IV–B and V–B of the Mendeleev Periodic Table, and wherein said organo-metallic compound and said metallic halide are present in a molar ratio of from 1:10 to 10:1, permitting reaction to take place in an anhydrous and inert atmosphere, allowing crystals to form and settle out from the resulting reaction mixture and thereafter recovering the crystals from said reaction mixture.

7. The process of claim 6, wherein said organo-metallic compound and said metal halide are present in a molar ratio of 1:1.

8. The process of claim 6, wherein said polar monomer is acrylonitrile.

9. A composition of matter suitable for use in initiating the polymerization of ethylenically unsaturated polar monomers which comprises the products obtained by first introducing tetraethyl lead into a solution of dioxane followed by the addition thereto of stannic chloride, and wherein said tetraethyl lead and said stannic chloride are present in a molar ratio of from 1:10 to 10:1, permitting reaction to take place in an anhydrous and inert atmosphere, allowing crystals to form and settle out from the resulting reaction mixture and thereafter recovering the crystals from said reaction mixture.

References Cited by the Examiner

UNITED STATES PATENTS

| | | | |
|---|---|---|---|
| 2,608,554 | 8/52 | Bullitt | 260—88.7 |
| 2,927,086 | 3/60 | Gordon et al. | 252—429 |
| 2,961,433 | 11/60 | Linn | 260—88.7 |
| 3,050,470 | 8/62 | Pearson et al. | 252—429 |
| 3,050,471 | 8/62 | Anderson et al. | 252—429 |
| 3,088,940 | 5/63 | Jenkins | 260—88.7 |

FOREIGN PATENTS

| | | |
|---|---|---|
| 809,717 | 3/59 | Great Britain. |
| 832,319 | 4/60 | Great Britain. |
| 833,579 | 4/60 | Great Britain. |

OTHER REFERENCES

Marvel et al., J. Am. Chem. Soc., vol. 80, pp. 830–1 (1958).

Gaylord et al., Linear and Stereoregular Addition Polymers, Interscience (1959), pp. 470–471.

JOSEPH L. SCHOFER, *Primary Examiner*.

MILTON STERMAN, LOUISE P. QUAST, DONALD E. CZAJA, LEON J. BERCOVITZ, *Examiners*.